Dec. 3, 1935.         R. R. BACON         2,023,161
             METHOD OF HEATING FLUIDS
                 Filed Feb. 4, 1933
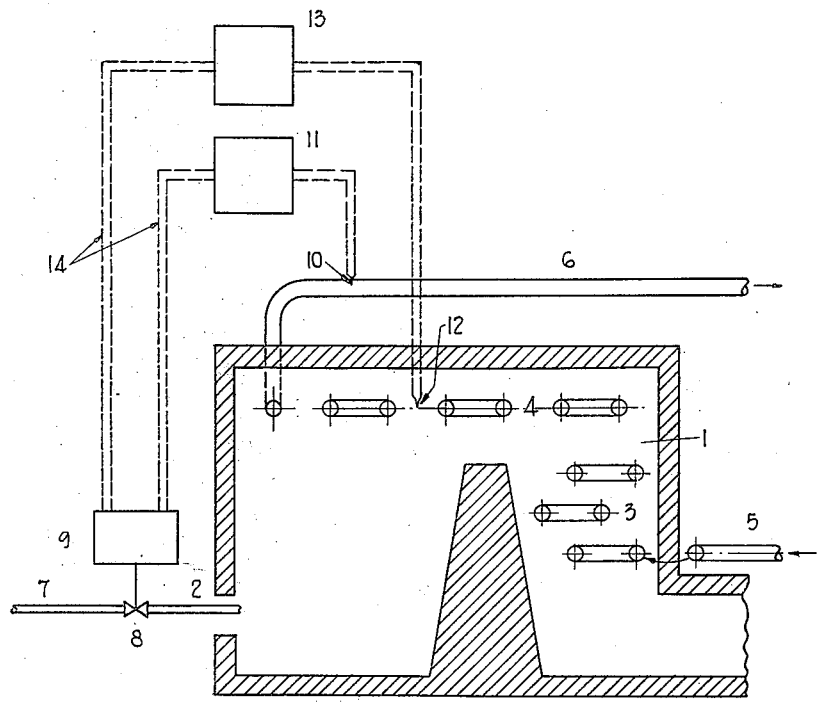
Inventor: Russel R. Bacon.
By his Attorney Patented Dec. 3, 1935

2,023,161

UNITED STATES PATENT OFFICE 2,023,161

METHOD OF HEATING FLUIDS

Russel Reynolds Bacon, Wilmington, Calif., assignor to Shell Development Company, San Francisco, Calif., a corporation of Delaware Application February 4, 1933, Serial No. 655,227

3 Claims. (Cl. 236—69)

This invention relates to the methods of operating tubular heaters, and is particularly concerned with the method of automatically maintaining the heated fluid at an approximately constant predetermined temperature.

While my method of control can be used in connection with the heating of any fluid passing in a confined stream through a heater, conventionally called a tubular heater, I shall, for the purpose of illustration, describe my invention as it can be used when heating a stream of mineral oil, which oil is to be either cracked, or distilled, or otherwise treated.

The methods for automatic regulation of fuel supply and/or rate of oil flow through the heater as a function of the temperature of the heated oil have been known for some time. Generally, in order to assure the smoothness of operation, is is very desirable to maintain the temperature of the heated oil as nearly constant as possible. In practice, however, it is unavoidable, that small fluctuations either in the heating conditions, such as heating value of fuel, rate of the fuel supply, etc., or changes in the oil throughput, or oil temperature, occur, resulting in more or less appreciable fluctuations in the temperature of the heated oil. If the oil heating equipment were always operated at its rated capacity, or below it, there would be little danger from these relatively slight changes in the operating conditions. It is very often necessary, however, to operate such an equipment under conditions near its actual capacity, putting great strains on the materials of which various parts of the heating equipment are constructed. This manner of operation makes it very important to have the fluctuations above referred to so limited as to make it substantially impossible to overtax the equipment's capacity to a breaking point. The present invention has for its object to provide a method of controlling temperatures within oil heaters which would allow a safe operation even when the oil heaters are run near the limit of their capacity. This invention may also be of a great value even when a heating apparatus is operated without undue strain, and would serve to assure a continuous and safe operation, should a sudden change in the operating conditions develop.

Briefly, my invention resides in an improvement of the known methods of maintaining constant temperature in the oil transfer line by automatically regulating the fuel supply, and consists, more specifically, of modifying this regulation in such a manner, that the rate of fuel supply is automatically limited by the predetermined temperature at the selected part of the furnace. Accordingly, whenever the transfer line temperature, which is the temperature of the heated oil, falls below normal, and the rate of combustion is increased by means of any known automatic control means, in order to bring this temperature to normal, I prevent the development of excessive heat within the furnace by providing a secondary automatic control means, which act to check further increase in the heat supplied to the furnace, as soon as a critical predetermined temperature is reached within the region of the furnace, where the danger of overheating is the greatest, such as near the upper row of tubes over the bridge wall, so that, if the normal transfer temperature has not yet been restored, further heating of the oil is carried out with said critical temperature maintained in this particular part of the furnace, and the overheating and possible damage to the equipment is thus prevented.

In order to further illustrate the application of my invention, the reference is to be had to the accompanying drawing, which shows diagrammatically an elevation view, partly in section, of a tubular heater provided with the control means according to my invention.

In this drawing, I represents a furnace provided with a burner 2, and serially connected coils 3 and 4 positioned in the furnace through which the oil to be heated is passed; it enters the coils through a pipe line 5 and after being heated, while passing through the coils 3 and 4, is discharged from the heater through a transfer line 6. Fuel is supplied through a pipe line 7, and its supply is controlled by a valve 8, which is operated by an electric motor 9.

A thermocouple 10 is placed in the transfer line 6, thereby providing a controlling means to operate, through a control box 11 and the motor 9, the fuel valve 8. Another thermocouple 12 is shown placed near the heating coil 4 in the radiation zone of the furnace 1; this thermocouple provides means for checking the increase of or reducing the heat input to the furnace 1, whenever the temperature within the zone near the point reaches the maximum allowable value. A control box 13 is provided to relay the current from 12 to the motor 9. The numeral 14 designates electric leads.

In the operation, the thermocouple 12 remains inactive, i. e. the motor 9 is not affected by the current changes originating in this thermocouple, until the critical temperature near the coil 4 is reached. Up to this moment the valve 8 is automatically operated by the motor 9 solely in accordance with the fluctuations in the transfer temperature, which are registered by the thermocouple 10 and transmitted to the motor 9 through the control box 11; when the transfer temperature rises above a predetermined value, the valve 8 partly closes, and when the temperature falls, the valve 8 opens, thereby changing the rate of burning the fuel and adjusting heat input to the furnace so that approximately constant transfer temperature is maintained.

The average amplitude of the fluctuations in the transfer temperature during normal operation depends on many factors, such as the size and construction of the furnace, types of fuel, fuel control valves and burners, arrangement of heating tubes, throughput, etc., and usually can be reduced to a reasonably narrow range; to obtain this, very sensitive and quickly operating means for regulating the fuel flow in accordance with temperature changes in the transfer line should be used, so that any slight deviation from the normal transfer temperature is quickly counteracted by a commensurate change in the heat input. It infrequently happens, however, in the actual practice, that a sudden and relatively violent change in the transfer temperature is caused either by any accident, or intentionally; if the new oil temperature is above normal, then the reaction of the fuel control valve would be to partly shut off the fuel until the furnace temperature drops sufficiently to bring the transfer temperature to normal; no danger is involved in this case. The consequences may be entirely different, if the transfer temperature would suddenly drop far below normal. Automatically the rate of fuel flow would be sharply increased, resulting in a greatly increased heat input corresponding to the temperature drop in the transfer line; the oil temperature would begin to rise, but due to the unavoidable lag in the absorption of heat by the oil, the excessive temperatures in the furnace would be reached well in advance of the normal temperature in the transfer line; this overheating within the furnace may and did cause sometimes a great damage.

My method of control would prevent such disastrous occurrences. Whenever the temperature in the pipe 6 becomes below normal the automatically controlled valve 8 allows more fuel to be burned in the furnace. The additional heat causes the temperature within the furnace 1 to rise; the furnace temperature cannot exceed, however, a certain safe predetermined temperature near the coil 4; as soon as this temperature is registered by the thermocouple 12, the operation of the valve 8 is modified so as to admit only enough fuel not to exceed this critical furnace temperature until the normal oil temperature in 6 is restored. After that the valve 8 is again controlled solely by the thermocouple 10, until excessive temperatures are developed within the furnace.

By an excessive temperature within the furnace, I do not intend to designate either the average temperature of different parts of the furnace or any other temperature, but only the highest allowable temperature in the weakest part of the furnace, i. e. that part which would be most easily put out of service, whenever the gradualy increasing heat input would cause that temperature to be reached. Those who are familiar with the art of heating fluids are usually well aware which parts of the furnace should be especially protected against overheating, and whenever these are not definitely known, or when several such weak points are known to exist in the furnace,—a corresponding number of thermocouples similar to 12 can be used, which being positioned at these points and connected in parallel, would actuate the valve 8, whenever one of them would become the first to be exposed to its critical temperature. In this case it may be desirable to adjust the operation of thermocouples (by inserting suitable resistances), so that various critical temperatures corresponding to the respective parts of the furnace would cause the valve 8 to operate, as soon as one of these temperatures is reached in the corresponding part of the furnace.

Although I have confined the description of my invention to its uses in connection with a tubular oil heater, it should be realized that it may be also applied to control the heating of other fluids and used in somewhat different apparatus. It is not intended to limit this invention, in its broader scope, to either any specific means for registering and transmitting the effect of temperature changes in the heated fluid and the furnace, or the manner in which the heat input into the furnace is regulated, as all these details can be varied in different applications of my new method of control of heating by those skilled in the art.

The invention is particularly intended, however, for controlling the operation of tubular heaters wherein the heat input to the furnace is regulated to maintain the heated oil at a predetermined temperature, and which operation is hereby augmented by the new feature of limiting said heat input by an additional means operated in accordance with the temperature conditions at the part of the furnace which would be most readily damaged by excessive heat.

I claim as my invention:

1. In a tubular heater the combination of means responsive to the temperature of a heated fluid with means responsive to a predetermined temperature in a selected part of the heater outside the tubes, the first means being adapted continuously and automatically to regulate the heat input into the heater for maintaining the temperature of the heated fluid at a predetermined value, and the second means adapted to remain idle until the predetermined temperature in the heater outside the tubes is reached and to cooperate with the first means to limit the heat input and maintain the temperature below said predetermined temperature in the heater outside the tubes.

2. In a tubular heater for continuously heating a fluid to a predetermined temperature, the combination with means for supplying heat to a combustion space and regulating means for varying the quantity of heat supplied, of a first control means responsive only to the temperature of the heated fluid adapted to normally control the operation of said regulating means so as to maintain the temperature of the heated fluid at said predetermined temperature, and a second control means responsive only to the temperature at a point in the combustion space of the heater to actuate said regulating means only when the temperature at said point is above a second predetermined value in a manner to reduce the supply of heat when the temperature at the said point rises above said second predetermined value.

3. In a tubular heater for continuously heating a fluid to a predetermined temperature, the combination with means for supplying heat to a combustion space and regulating means for varying the quantity of heat supplied, of a first control means responsive only to the temperature of the heated fluid adapted to normally control the operation of said regulating means so as to maintain the temperature of the heated fluid at said predetermined temperature, and a second control means responsive only to the temperature near the point in the combustion space of the heater where damage due to overheating is most likely to occur to actuate said regulating means only when the temperature at said point is above a second predetermined value in a manner to reduce the supply of heat when the temperature at the said point rises above said second predetermined value.

RUSSEL REYNOLDS BACON.